United States Patent [19]
Paik et al.

[11] Patent Number: 6,163,621
[45] Date of Patent: Dec. 19, 2000

[54] HISTOGRAM EQUALIZATION METHOD AND DEVICE IN CONTRAST ENHANCEMENT APPARATUS FOR IMAGE PROCESSING SYSTEM

[75] Inventors: Joon Ki Paik; Sung-Il Su; Chul-Ho Lee, all of Seoul, Rep. of Korea

[73] Assignee: Samsung Electronics Co., Ltd, Kyungki-do, Rep. of Korea

[21] Appl. No.: 09/032,223

[22] Filed: Feb. 27, 1998

[30] Foreign Application Priority Data

Feb. 27, 1997 [KR] Rep. of Korea ......................... 97-6231

[51] Int. Cl.⁷ ..................................................... G06K 9/00
[52] U.S. Cl. .......................................... 382/169; 382/274
[58] Field of Search ..................................... 382/169, 171, 382/168, 274; 348/672, 222; 358/455, 458, 520, 501, 504; 345/147, 149

[56] References Cited

U.S. PATENT DOCUMENTS

| | | | |
|---|---|---|---|
| 3,983,320 | 9/1976 | Ketcham et al. | 348/672 |
| 4,450,482 | 5/1984 | Ackermann | 348/672 |
| 5,144,442 | 9/1992 | Ginosar et al. | 358/209 |
| 5,204,910 | 4/1993 | Lebeau | 382/152 |
| 5,388,168 | 2/1995 | Sakashita et al. | 382/169 |
| 5,588,071 | 12/1996 | Schultz | 382/168 |

OTHER PUBLICATIONS

Gonzalez et al., "Digital Image Processing", Addison–Wesley, p. 173–181, Mar. 24, 1992.

*Primary Examiner*—Yon J. Couso
*Attorney, Agent, or Firm*—Skjerven, Morrill, MacPherson LLP; David T. Millers

[57] ABSTRACT

In contrast enhancement during image processing, a histogram equalization process or apparatus divides an equalization image screen into overlapping windows and performs histogram equalization on each window. Using windows improves contrast of pixel values that are rare throughout the entire image and reduces or prevents loss of information represented by the rare pixel values. Overlapping the windows reduces discontinuities at the boundaries of the windows. The size and overlap of the windows can be adjusted according to the time available for equalization and can be optimized according to the desired image quality improvement. The histogram equalization can be selectively performed on an entire image screen or any part thereof to reduce image degradation in the entire or part of an image. As a further aspect of the invention, to reduce the number of operations required for equalization, a histogram for a current window is obtained starting from the histogram for a previous window. To further improve image quality, a histogram equalization apparatus uses low-pass- or band-pass-filtered pixel data as a lookup table address to output a histogram-equalized value. This helps remove amplified thermal or quantization noise.

23 Claims, 5 Drawing Sheets

HISTOGRAM EQUALIZATION METHOD AND DEVICE IN CONTRAST ENHANCEMENT APPARATUS FOR IMAGE PROCESSING SYSTEM

BACKGROUND

1. Field of the Invention

This invention relates to image processing and to a contrast enhancement apparatus using a histogram equalization method to enhance image contrast.

2. Description of the Related Art

Some known image processing systems use a histogram equalization method to expand the dynamic range of an image and increase the image contrast. Here, the dynamic range of an image is the ratio of the luminance or brightness of the brightest pixel forming the image to that of the darkest pixel. Image contrast generally increases with the dynamic range. Pages 241 and 242 of "Fundamentals of Digital Image Processing" by A. K. Jain, (Prentice-Hall, 1989) describe a global histogram equalization method that expands the dynamic range of an image. The global histogram equalization method improves contrast in areas of the image where pixels have brightness values that occur frequently throughout the image. However, global histogram equalization degrades contrast in areas of the image where pixels have brightness values that are rare in the original image. Degradation occurs because histogram equalization transforms rare brightness values to relatively common brightness values. Therefore, when pixels having rare brightness values convey important information, the information can be lost or degraded. Thus, conventional histogram equalization methods can, although very rarely, destroy image information.

Korean Patent Laid-open Publication No. 96-036551 discloses an non-overlapped locally adaptive histogram equalization method that prevents contrast degradation. The adaptive histogram equalization method divides an image into uniform sized blocks or windows that do not overlap. Then, the adaptive histogram equalization is performed for each block. The adaptive histogram equalization method does not degrade contrast in areas of the image where pixels have brightness values that are globally rare in the original image. Accordingly, loss of important information conveyed by the pixels having rare brightness values can be prevented. However, the adaptive histogram equalization method determines the histogram equalization values for pixels included in one block without using pixels included in other blocks. Thus, this adaptive histogram equalization method can degrade image quality due to discontinuity between adjacent blocks.

SUMMARY

An equalization method in accordance with an embodiment of the invention divides an image or a portion of an image into windows that overlap, and applies histogram equalization to each window. Accordingly, a brightness value that is rare globally (i.e., throughout the entire image) may be relatively less rare in a particular window, and a transform function for the window containing the rare brightness value does not transform the rare value to a relatively common brightness value. Accordingly, an equalization method in accordance with the invention reduces or prevents loss of image information that rare brightness values convey. Since the windows overlap (i.e., each window contains many of the same brightness values as neighboring windows), the transform functions for the neighboring windows are not abruptly different as can be the case when windows do not overlap. Accordingly, an equalization method in accordance with the invention does not introduce boundary effects at the boundaries of the windows.

To reduce the computational burden of determining separate histograms for a large number of windows, one histogram equalization method in accordance with the invention determines a histogram for one window starting from an already calculated histogram for a given overlapping window. For example, if a first window has a first histogram and a second window that overlaps the first window has a second histogram, the second histogram can be determined from the first histogram by increasing histogram counts to account for pixels in the second window and not in the first window, and decreasing histogram counts to account for pixels that are in the first window but not in the second window.

One embodiment of the invention is a histogram equalization method for histogram-equalizing an image screen, in a contrast enhancement apparatus of an image processing system. The method includes: (a) selecting a window from a series of windows, wherein the series of windows collectively cover the entire or a portion of the image; (b) determining a histogram of pixel values for the selected window; (c) determining a transform function for the selected window from the histogram for the selected window; and (d) applying the transform function for the selected window to pixel value(s) corresponding to at least one of the pixels of the selected window, wherein applying the transform function to a pixel value generates an equalized value, and repeating steps (a) through (d) for each window in the series. Upon completion of the process, equalized values for the image are output to control visual appearance of pixels in an image that is stored or displayed. The pixel values typically indicate the brightness of a pixel.

Directly counting the number of pixels at each pixel value level can determine a histogram for a window. Alternatively, the histogram for a current window is determined from the histogram for a previous window to reduce the amount of calculation. For example, one histogram operation determines whether a window is a boundary window or non-boundary window. A boundary window includes pixels on a selected edge of the portion of the image. If the window is a boundary window, the operation resets counts associated with the histogram, and then for each pixel in the window, increments a count associated with the level identified for the pixel. If the window is not a boundary window, the histogram operation retains the counts for a preceding window and, for each pixel that is in the current window and not in the preceding window, increments a count associated with the level identified for the pixel. Additionally, for each pixel that is in the preceding window and not in the current window, the histogram operation decrements the count associated with the level identified for the pixel. Equivalently, if the current window is not a boundary window, the histogram operation determines a first histogram of pixel values for pixels which are in the current window and not in a previous window in the series; determines a second histogram of pixel values for pixels which are in the previous window and not in the current window; and combines the previous histogram, the first histogram, and the second histogram. The second histogram is combined with a negative sign, i.e., subtracted.

Apparatuses in accordance with the invention implement equalization methods. One such apparatus includes: an image data storage unit for pixel data; a histogram operation unit; an equalized value generating unit; and a controller. In response to a first address signal, the image data storage unit outputs a first set of pixel values representing pixels in a window, and in response to a second address signal, the image data storage unit outputs a second set of pixel values representing a first number of pixels of the window. The histogram operation unit generates counts indicating a histogram of the first set of pixel values. The equalized value generating unit receives counts from the histogram operation unit and the second set of pixel values from the image data storage unit, determines a transform function from the counts, and outputs, in response to the second set of pixel values, the first number of equalized values. The controller generates the first address signal corresponding to addresses of a current selected window in a series of windows that collectively cover the entire or a portion of an image and generates the second address signal according to the first address signal.

Histogram equalization of overlapping windows that cover the image screen prevents degradation of the contrast that rare pixel values generate. Additionally, the second set of pixel values can be low-pass-filtered or band-pass-filtered to remove quantization noise or thermal noise, before being input as an address to a lookup table which stores equalized values for all pixels included in the selected window, to output a histogram-equalized value. To reduce the required the number of operations, the histogram with respect to the current window can be obtained from the histogram for the previous window.

BRIEF DESCRIPTION OF THE DRAWINGS

The objects and advantages of the present invention will become more apparent by describing in detail embodiments thereof with reference to the attached drawings in which.

DETAILED DESCRIPTION

Figure 1:
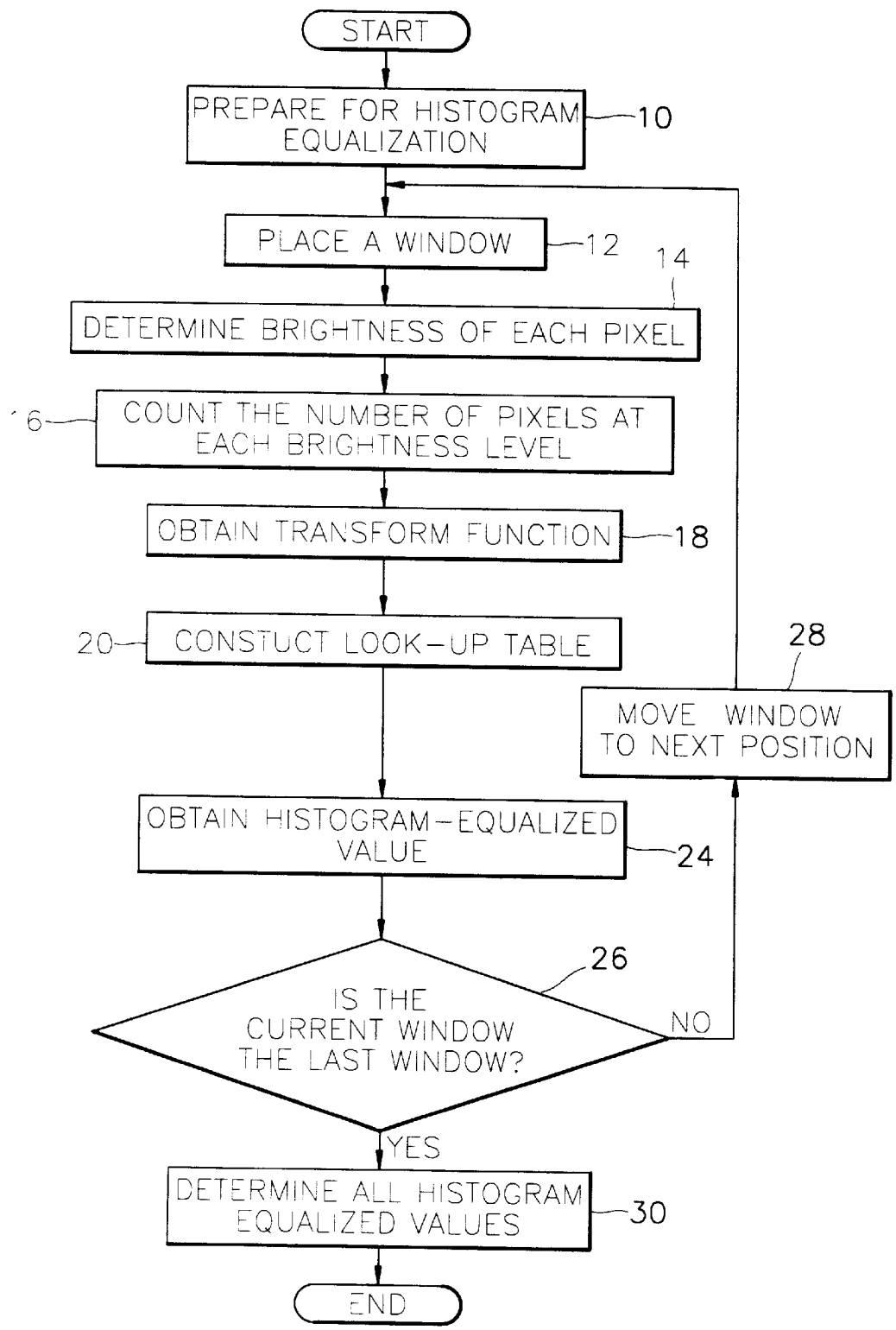
FIG. 1 is a flowchart illustrating a histogram equalization method according to an embodiment of the invention.

Referring to FIG. 1, a histogram equalization method according to the invention includes steps 10 and 12 that identify parameters for a histogram equalization process and select a window in an image, steps 14 and 16 which determine a histogram for the selected window, steps 18, 20 and 24 which determine a transform function from the histogram and obtain equalized brightness values for at least one of the pixels of the window, and steps 26, 28 and 30 which move to the next window or if the last window has been equalized, output equalized values for the image.

Step 10 determines parameters in a preparation for histogram equalization. The parameters indicate the size of the image, the size of a portion of the image to be equalized, the size of widows used in histogram equalization, offsets between the windows, and which pixels in each window are equalized using the transform function for the window. The parameters can be selected according to the desired image quality or the available time for the histogram equalization process.

Parameters A and B are respectively the number of columns and the number of rows of pixels in an image. A portion of the image that is to be histogram-equalized is sometimes referred to herein as the 'equalization image screen.' In preparation for histogram equalization, step 10 determines the number of columns M of pixels and the number of rows N of pixels in the equalization image screen. If the entire image is to be equalized, M and N are respectively equal to A and B. Otherwise, M or N is respectively less than A or B. Thus, parameters M and N indicate whether contrast in all or part of the image is to be equalized. Parameters P and Q respectively indicate the number of columns and the number of rows of pixels in each of the windows that cover the equalization image screen. The window size P×Q may be from 11×11 to 41×41, for example. A parameter F indicates the offset in pixels from one window to the next. Parameter F can be a horizontal offset or a vertical offset depending on whether two windows overlap horizontally or vertically. For the windows to overlap horizontally, parameter F must be less than P. For the windows to overlap vertically, parameter F must be less than Q. From Equation 1 and parameters M, N, P, Q, and F, step 10 further determines a number C of windows required to cover the equalization image screen.

Equation 1:

$$C = D \cdot E = \left(1 + \frac{M-P}{F}\right) \cdot \left(\frac{N}{Q}\right) \quad \text{for horizontal overlap}$$

$$C = D \cdot E = \left(\frac{M}{P}\right) \cdot \left(1 + \frac{N-Q}{F}\right) \quad \text{for vertical overlap}$$

$$C = D \cdot E = \left(1 + \frac{M-P}{P}\right) \cdot \left(1 + \frac{N-Q}{F}\right) \quad \text{for horizontal and vertical overlap}$$

D and E respectively denote the numbers of windows required in a row and a column to cover the equalization image screen.

After determining the necessary parameters, step 12 selects a window covering a portion of the image. Then, steps 14 and 16 determine a histogram for the window. Each window contains P×Q pixels that have P×Q corresponding pixel values. The pixel value for a pixel indicates the properties such as the brightness of the pixel. For contrast enhancement, the pixel values of interest are an array of brightness or luminance values. Each brightness value is a number in a range, e.g., 0 to 255, when the value is coded by 8-bit binary numbers. For generality in the following description, each pixel has one of K different possible brightness levels. To construct a histogram for the current window, step 14 determines the brightness level of each of the P×Q pixels in the window, and step 16 determines counts H(x) of is pixels at each brightness level x.

From the histogram for the current window, step 18 determines a transform function that maps the brightness levels to equalized brightness levels for improving image contrast. One method for determining a transform function Y(x) from histogram counts H(x) accumulates for each brightness level x, the sum of each count H(x') for $x' \leq x$ and multiplies the result by the ratio of the number K of brightness levels by the number P·Q of pixels in the window. Equation 2 summarizes this transform function Y(x) for histogram counts H(x).

Equation 2: $$Y(x) = \frac{K}{P \cdot Q} \cdot \sum_{x'=0}^{x} H(x')$$

Applying the transform function Y(x) of Equation 2 to the pixel values for the current window can stretch the dynamic range of the window to the full possible range. Alternative transform functions are possible. For example, Equation 3 illustrates a transform function Y(x) that maps brightness values x to a range of brightness values having a minimum Ymin and a dynamic range controlled by a parameter α.

Equation 3: $$Y(x) = Y_{min} + \alpha \cdot \frac{K}{P \cdot Q} \cdot \sum_{x'=0}^{x} H(x')$$

Parameters Ymin and a can be selected according to characteristics of the pixels in the window and the image as a whole. Step 20 applies the determined transform function to each brightness level to construct a look-up table representing the transform function.

After steps 18 and 20, the process uses the transform function to determine histogram-equalized values for T pixels from the current window, T being one or more. The T pixels are selected according to the offsets between the windows and whether the window is at an edge of the equalization image screen. Here, a window which includes one or more pixels at any edge of the equalization image screen is defined as an edge window. A window that is not an edge window is a non-edge window. With these definitions, T for a non-edge window differs from T for an edge window. For example, for a non-edge window, if windows overlap both horizontally and vertically, T is 1 if the offset is one pixel, and T is 4 if the offset is two pixels. Generally, T is F×F for non-edge windows if the offset is F pixels and windows overlap both horizontally and vertically, and the histogram-equalized values for F×F pixels at the center of each non-edge window are determined from a transform function for the non-edge window. The histogram-equalized value for any pixel at an edge of the equalization image screen is determined using the transform function for the edge window having a center nearest to the pixel at the edge. Thus, variable T can have different values depending on whether the current window is an edge window or a non-edge window. When the current window is a non-edge window, T is smaller than when the current window is an edge window.

Before applying the transform function, optionally, a filter can be applied to the portion of the image including the T pixels to be equalized. For example, video data compressed in accordance with the MPEG video standard and then restored may contain amplified quantization noise, and a low-pass filter can be optionally applied to the pixel values to remove the amplified quantization noise. Even if the image data was not compressed and restored, the low-pass filtering can remove thermal noise. Alternatively, a band-pass filter, instead of the low-pass filter, can be applied to the pixel values to remove the amplified quantization noise or the thermal noise. Step 24 applies the transform function to the T pixel values resulting after the optional filtering step (not shown).

After step 24, step 26 determines whether the current window is the last window required to cover the equalization image screen. If not, step 28 identifies the next window by shifting the coordinates of the current window by F pixels in a horizontal or vertical direction. In general, the window covers the equalization image screen from left to right and from top to bottom, to allow efficient storage and management of the pixel values stored in memory. Step 12 selects the next window which steps 14 to 24 process as described above. Once step 26 determines the last window covering the equalization image screen has been processed, step 30 outputs the histogram-equalized values.

Figure 2:
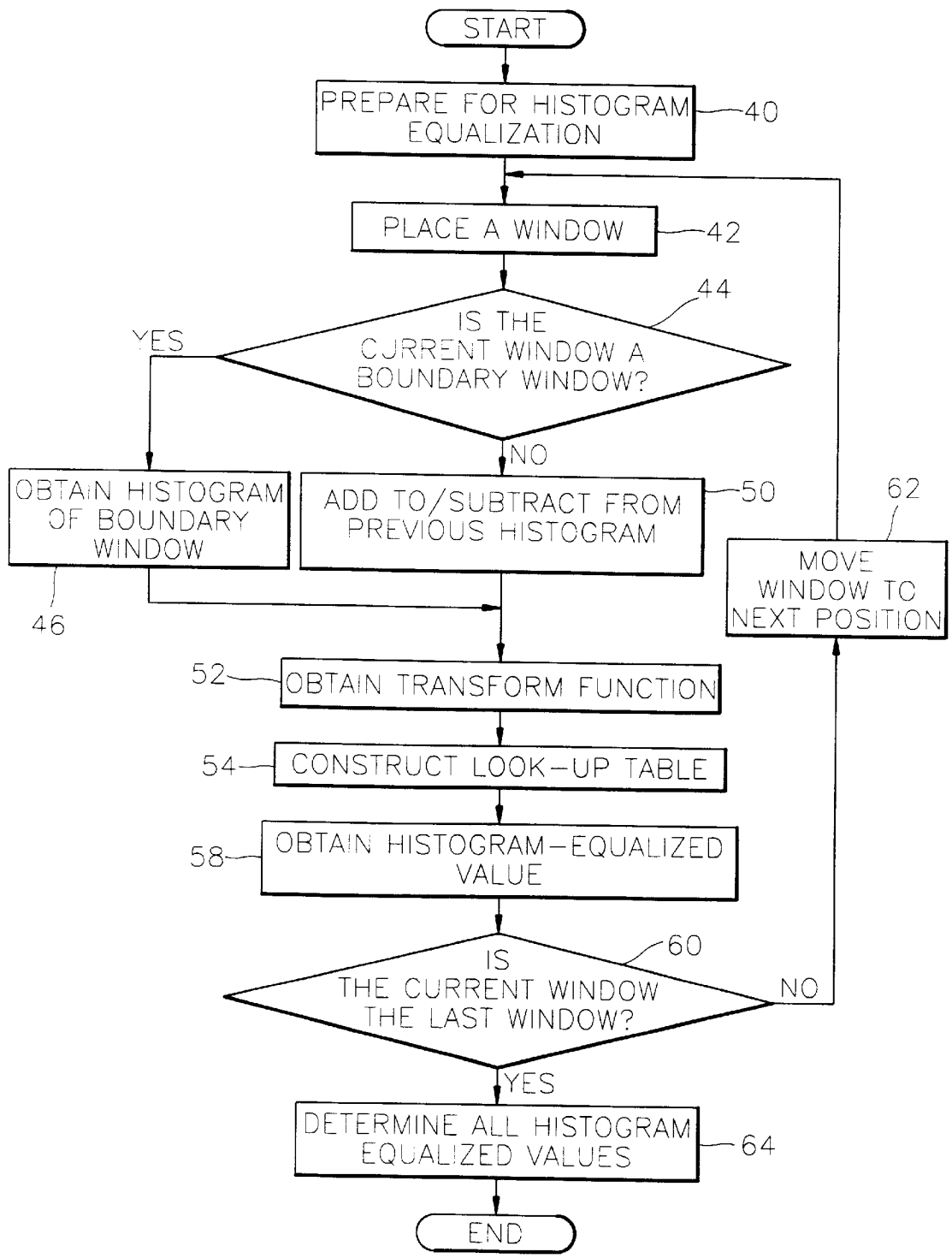
FIG. 2 is a flowchart illustrating a histogram equalization method according to another embodiment of the invention.

FIG. 2 illustrates a histogram equalization method according to another embodiment of the invention. In FIG. 2, the histogram equalization method includes steps 40 and 42 which prepare for histogram equalization and select a current window; steps 44, 46 and 50 which obtain a histogram differently depending on the type of the current window; steps 52, 54 and 58 which determine a transform function and T histogram-equalized values for the current window; and steps 60, 62 and 64 which move to a next window or output all of the histogram-equalized values, depending on whether the current window is the last.

Steps 40 and 42 shown in FIG. 2 are the same as the steps 10 and 12 of FIG. 1. After step 42, step 44 determines whether the current window is a boundary window or a non-boundary window. A window including pixels at a selected edge, for example, the left-most column or the uppermost row of the equalization image screen is referred to herein as a boundary window. The other windows are non-boundary windows. If the current window is a boundary window, step 46 uses the method of steps 14 and 16 described above to obtain a histogram of the pixels in the boundary window. However, if the current window is a non-boundary window, step 50 determines the histogram for the current window starting from the histogram for the previous window. (Note that the first window selected is a boundary window.) In particular, step 50 increases histogram counts to account for pixels in the current window but not in the preceding window and decreases histogram counts to account for pixels in the previous window that are not in the current window. This is equivalent to determining a first histogram for pixels in the current window but not in the preceding window, determining a second histogram for pixels in the preceding window but not in the current window, adding the first histogram to the histogram for the preceding window, and subtracting the second histogram from the sum of histograms. The number of operations required for step 50 is number of pixels that are either in the current window but not in the previous window or in the previous window but not in the current window. If there is a significant overlap between the windows, the number of operations required for step 50 is less than the number of operations required for step 46. Accordingly, the method of FIG. 2 may be faster than the method of FIG. 1.

After step 46 or 50, steps 52 to 64 can obtain T histogram-equalized values for each window and output all of the histogram-equalized values in the same manner as steps 18 to 30 of FIG. 1. However, an alternative procedure in step 52 can reduce the number of operations required to obtain the transform function for a non-boundary window. In particular, the alternative method determines the differences between the histogram of pixels in the previous window and the histogram of pixels in the current window, and then for each brightness level, accumulates the resulting differences corresponding to levels less than or equal to the brightness level. Then, the accumulated results are added to the accumulated results obtained for the transform function of the previous window. The results indicate the transform function for the histogram-equalized values for pixels in the current window.

Figure 3A:
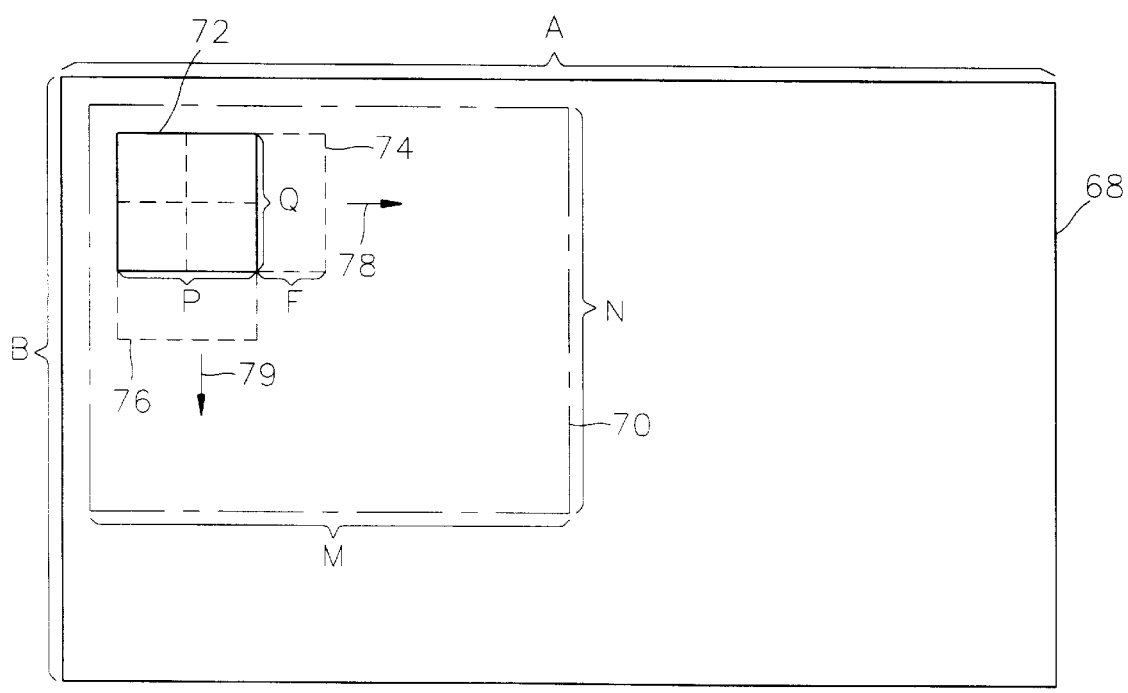
FIG. 3A shows the entire image screen, equalization image screen, and windows of the image screen for explaining the embodiments of the present invention.

FIG. 3A shows the entire image screen 68, equalization image screen 70, and overlapping windows 72, 74 and 76 of image screen 68. Window 72 can be moved horizontally in the direction indicated by arrow 78, thus becoming window 74 (as indicated by the dashed lines). Alternatively, window 72 can be moved vertically in the direction indicated by arrow 79, thus becoming window 76 (as indicated by the dashed lines). Each of windows 72, 74, and 76 is an edge window. In the exemplary embodiment of the invention, boundary windows border the left edge of the equalization image screen, and a sequence of windows that covers equalization image screen 70 is organized into a set of rows. Each row includes a boundary window at the left edge of image screen 68, and each window in a row is horizontally offset from a previous window in the row. Accordingly, in the exemplary embodiment, windows 72 and 76 are boundary windows in different rows, and window 74 is a non-boundary window.

Figure 3B:
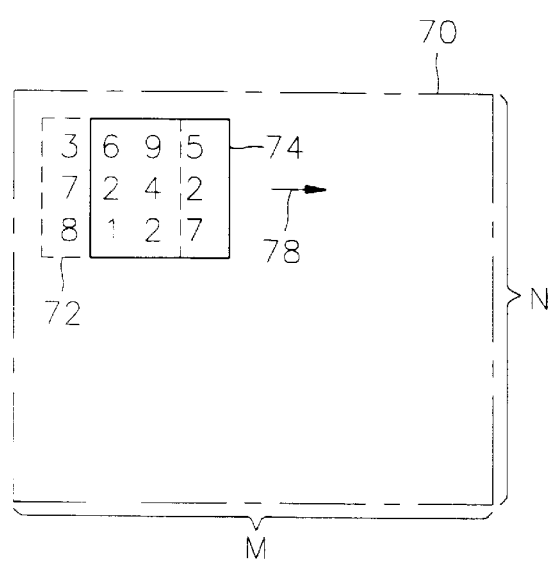
FIG. 3B shows the equalization image screen of FIG. 3A and brightness values for windows therein.

FIG. 3B shows the equalization image screen 70 of FIG. 3A and brightness values for windows 72 and 74 therein. Windows 72 and 74 cover a part of equalization image screen 70. Here, the windows 72 and 74 are edge windows, and a window 71 is non-edge window. As an example, the histogram equalization processes of FIGS. 1 and 2 are described as related to windows 72 and 74. For this example, the window size P×Q is 3×3, and the offset F in the horizontal direction indicated by arrow 78 is one pixel. The number K of possible brightness levels is 10 so that the possible brightness levels range from 0 to 9.

The method of FIG. 1 obtains a first histogram and a first transform function for window 72 and a second histogram and a second transform function for second window 74 as illustrated in Table 1.

TABLE 1

Histograms and Transform Functions for Windows in FIG. 3

| Brightness Value | Window 72 | | Window 74 | |
| --- | --- | --- | --- | --- |
| | Histogram | Transform Function | Histogram | Transform Function |
| 0 | 0 | 0 | 0 | 0 |
| 1 | 1 | 1 | 1 | 1 |
| 2 | 2 | 3 | 3 | 4 |
| 3 | 1 | 4 | 0 | 4 |
| 4 | 1 | 5 | 1 | 5 |
| 5 | 0 | 5 | 1 | 6 |
| 6 | 1 | 6 | 1 | 7 |
| 7 | 1 | 7 | 1 | 8 |
| 8 | 1 | 8 | 0 | 8 |
| 9 | 1 | 9 | 1 | 9 |

As described above, the method of FIG. 1 determines a histogram for a block by directly counting the number of pixels at each brightness level.

Since window 72 is a boundary window (i.e., is at the left edge of equalization image screen 70), the method of FIG. 2 determines the histogram for window 72 in the same manner as the method of FIG. 1, to give the same results as in the Table 1. Window 74 is a non-boundary window. To determine the histogram for window 74, the method of FIG. 2 starts with the histogram for window 72 and decrements the counts for values 3, 7, and 8 to account for the column of pixels in window 72 but not in window 74. The method then increments the counts for brightness values 5, 2, and 7 to account for the column of pixels in window 74 that are not in window 72. Accordingly, to obtain the histogram for window 74, the method of FIG. 2 requires six operations (increments or decrements of counts), one for each pixel in window 72 or 74 but not in the overlapping portion of windows 72 and 74, but the method of FIG. 1 requires nine operations, one for each pixel in window 74.

The transform functions are obtained from the first and second histograms. Applying the transform function to T pixels in a central portion of a non-edge window generates T histogram-equalized values, where T is 1, for example, for window 71. However, for an edge window, the transform function for the edge window is applied to pixels in a central portion and an edge portion of the edge window. Additionally, for edge windows at the top, left, right or bottom edge of equalization image screen 70, the exemplary embodiment applies the transform function for the edge window to pixel values corresponding to pixels between the central pixels and the appropriate edge or edges of equalization image screen 70. For example, edge window 72 is at the top and left edges of equalization image screen 70, and the exemplary embodiment applies the transform function for edge window 72 to four pixel values 3, 7, 6 and 2 to generate histogram-equalized brightness values 4, 7, 6 and 3. Edge window 74 is at the top edge of equalization image screen 70, and the exemplary embodiment applies the transform function for the edge window 74 to two brightness values 9 and 4 to generate equalized values 9 and 5.

In the same fashion as above, the exemplary embodiment of the invention determines the equalized value for the pixel values (5 and 2) in the upper-right corner and at middle of the right edge of window 74 using the transform function for an edge window (not shown) that follows window 74. The exemplary embodiment of the invention uses a transform function for a boundary window (not shown) that starts a row of windows including window 71 to determine the equalized values for the edge pixel (8) in the lower-left corner window 72 and a neighboring pixel (1). Equalized values for the remaining brightness values 2 and 7 in windows 72 and 74, respectively are obtained from transform functions for 3×3-sized non-edge windows that are centered on the respective pixels. For example, the transform function for non-edge window 71 determines the equalized value corresponding to the brightness value (2) of the pixel at the lower-right corner of window 72.

Figure 4:
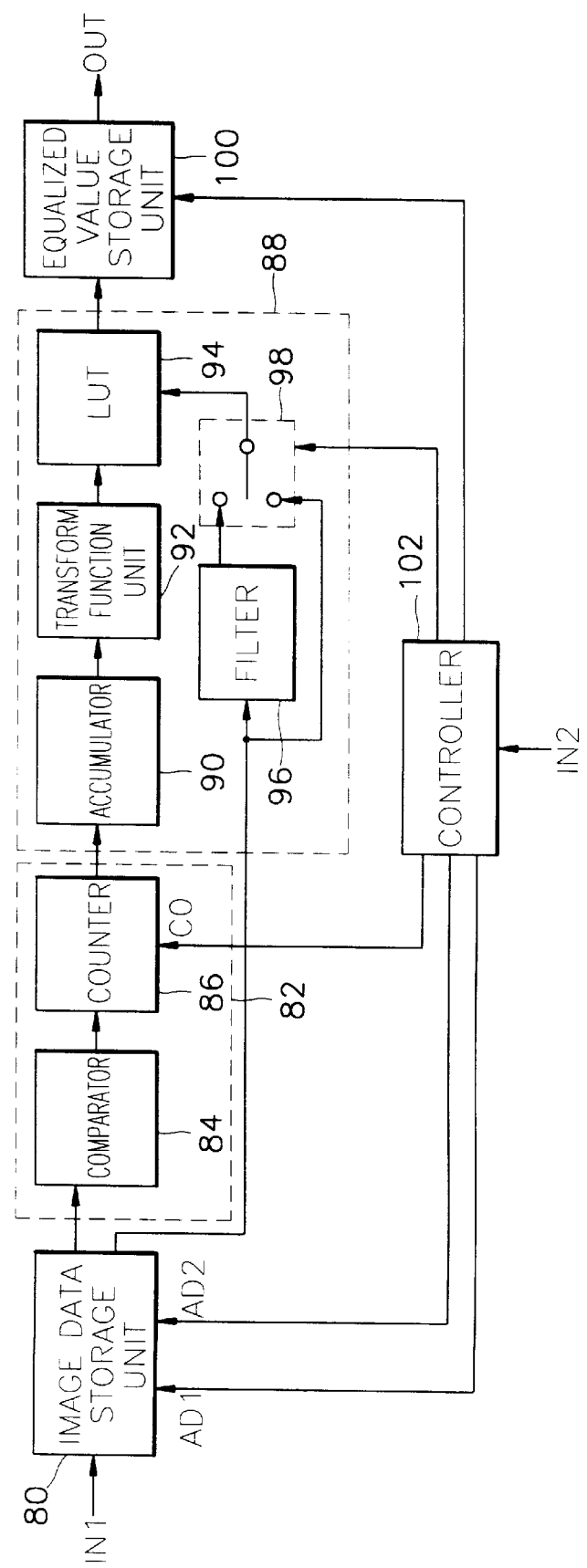
FIG. 4 is a block diagram of a histogram equalizing apparatus according to an embodiment of the invention.

FIG. 4 is a block diagram of a histogram-equalization device that according to an embodiment of the invention, performs the histogram equalization method of FIG. 1. The device includes an image data storage unit 80, a histogram operation unit 82, an equalized value generating unit 88, an equalized value storage unit 100, and a controller 102. Histogram operation unit 82 contains a comparator 84 and a counter 86. Equalized value generating unit 88 contains an accumulator 90, a transform function unit 92, a lookup table (LUT) 94, a filter 96, and a switch 98.

Storage unit 80 stores a digital image. Any source for the image signal can be used. For example, the source of the image signal can be a video decoder that decodes video frames or fields of a moving image from coded data (e.g., an MPEG encoded data stream) or a video or digital camera that generates an image signal according to measured magnitudes of brightness or color components of an image being recorded. In accordance with the invention, a single input image signal is sufficient for the equalization process. In particular, a video imaging apparatus in accordance with the invention can receive an image signal at a single exposure level and adjust the dynamic range image signal to enhancement of image details or provide an output image signal with the desired contrast. Such apparatuses are particularly useful in video and digital cameras but are not limited to those applications.

Storage unit 80 receives through an input port IN1 an image signal for A×B-pixel image and stores pixel values in the form of frame or field units. In response to a first address signal AD1 from controller 102, storage unit 80 outputs a first set of pixel values representing every pixel included in a current window. In response to a second address signal AD2 from controller 102, storage unit 80 outputs a second set of pixel values that correspond to the T pixels being equalized according to the transform function for the window. Through an input port IN2, controller 102 receives information such as the size and location of the equalization image screen, the offset (horizontal or vertical) between windows that cover the equalization image screen, and the size of each window. Controller 102 identifies the locations of the windows and, for each window, generates the first address signal AD1 to start a histogram operation on the window (i.e., on the first set of pixel values) and asserts the second address signal AD2 identifying the T pixel values (i.e., the second set) to be equalized.

Histogram operation unit 82 receives the first set of pixel values, identifies the brightness levels for the pixels corresponding to the first set, counts occurrences of each of K different brightness levels in the first set, and outputs K counts representing a histogram. For this, comparator 84 compares each input pixel brightness value with K different comparison values representing possible brightness levels, and outputs K comparison results as first to Kth counting control signals to counters 86. Counters 86 include K counters. The K counters respectively count the occurrences of the first to Kth counting control signals from comparator 84 and in response to a control signal C0 from controller 102, outputs the counts to accumulator 90 in the equalized value generating unit 88. Controller 102 generates control signal C0 after all pixel values of a window were compared with the K comparison values.

Equalized value generating unit 88 accumulates counts from counters 86, generates a look-up table for a transfer function, and outputs T histogram-equalized values in response to the second set of pixel values received from data storage unit 80. For this, accumulator 90 receives the final counter values, i.e., a histogram, and accumulates the counts in order of increasing brightness. For each brightness level x, accumulator 90 provides to transform function unit 92 an accumulation A(x) of counts H(x) up to brightness level x. Transform function unit 92 obtains the transform function Y(x) by multiplying the accumulation A(x) by the ratio of the number K of possible brightness levels and the number P·Q of pixels in the window. The resultant Y(x) is stored in LUT 94 in a storage location having an address corresponding to the brightness level x. Accordingly, in response to an input address signal from switch 98 having value x, LUT 94 outputs a histogram-equalized value Y(x).

At this time, filter 96, implemented as a low-pass filter or a band-pass filter, filters the second set of pixel values and applies T filtered pixel values to switch 98. Switch 98 outputs either the filtered pixel values or the unfiltered second set of pixel values to LUT 94 as the address signal. Controller 102 controls switch 98 to select the T filtered pixel value when a control signal at input port IN2 indicates data input through input port IN1 was restored after being compressed according to the MPEG standard.

Storage unit 100 acts as a buffer and stores equalized values sequentially received T at a time from equalized value generating unit 88. In response to an output control signal from controller 102, storage unit 100 outputs via an output port OUT, the stored, histogram-equalized values as the histogram-equalized image data corresponding to image data received through input port IN1. The histogram-equalized image can then be stored in a memory or on a magnetic media, or a video display can display the image with the histogram-equalized values determining the brightness of pixels in the image. The histogram-equalized values can improve contrast and enhance details in the image without washing out local contrast provided by rarely occurring brightness values.

Figure 5:
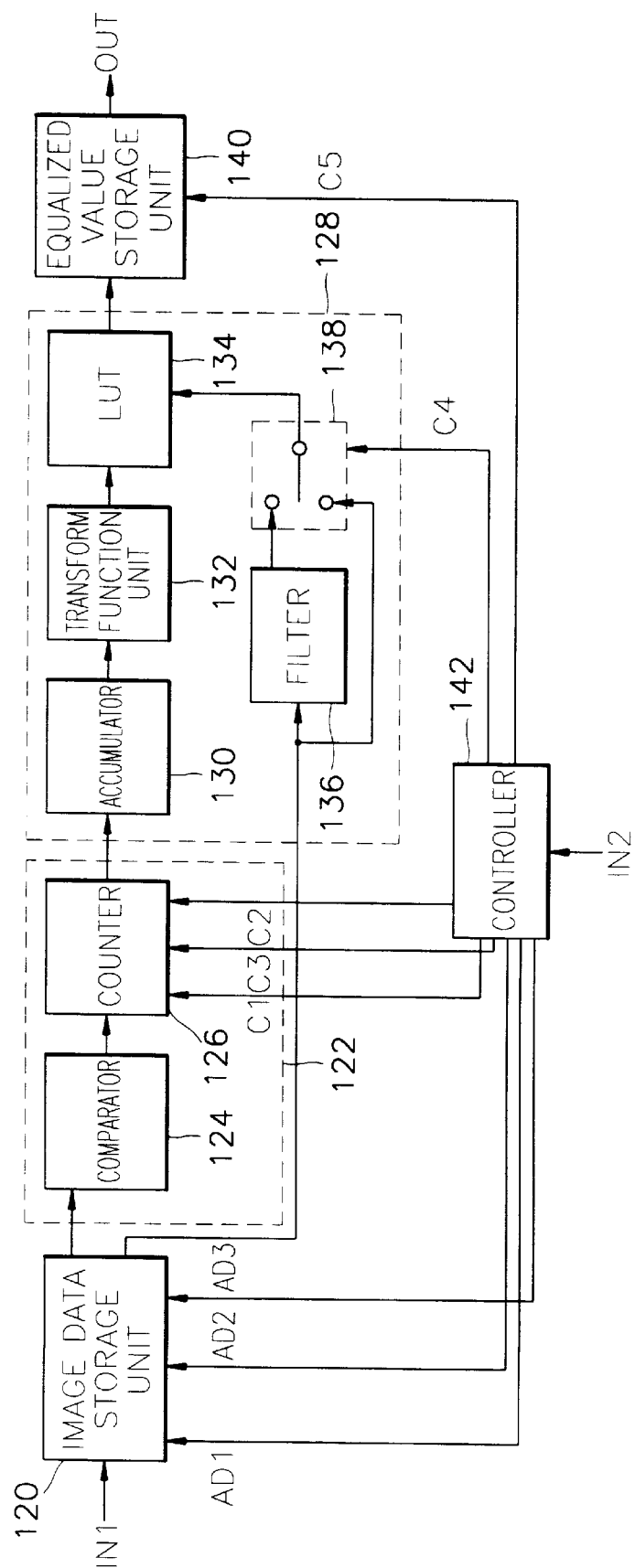
FIG. 5 is a block diagram of a histogram equalizing apparatus according to another embodiment of the invention.

FIG. 5 is a block diagram of a histogram equalizing device which performs the equalization method of FIG. 2 according to another embodiment of the invention. The device includes an image data storage unit 120, a histogram operation unit 122, an equalized value generating unit 128, an equalized value storage unit 140, and a controller 142. Histogram operation unit 122 includes a comparator 124 and counters 126. Equalized value generating unit 128 includes an accumulator 130, a transform function unit 132, a look-up table 134, a filter 136, implemented as a low-pass filter or a band-pass filter, and a switch 138.

Storage unit 120 of FIG. 5 stores image data received through an input port IN1. The image data constitutes of a A×B block of pixel values that corresponds to a frame or field units. Storage unit 120 outputs a first set of pixel values that correspond to all of the pixels in a boundary window (e.g., brightness values 3, 6, 9, 7, 2, 4, 8, 1, and 2 for window 72 of FIG. 3B) in response to a first address signal AD1 from controller 142. In response to a second address signal AD2, storage unit 120 outputs a second set of pixel values that correspond to pixels contained in a current window but not contained in the previous window (e.g., values 5, 2, and 7 which correspond to pixels in window 74 but not in window 72 in FIG. 3B) and a third set of values that correspond to pixels contained in the previous window but not contained in the current window (e.g., values 3, 7, and 8 in window 72 but not window 74 of FIG. 3B). In response to a third address signal AD3 from controller 142, storage unit 120 outputs a fourth set of pixel values that correspond to the T pixels being equalized.

For a boundary window, histogram operation unit 122 generates a histogram from the first set of pixel values. For a non-boundary window, histogram operation unit 122 adds to and subtracts from a previous histogram according to the second and third sets of pixel values from storage unit 120. In histogram operation unit 122, comparator 124 compares each pixel value with K comparison values, each representing a possible brightness level, and asserts one of K comparison result signals identifying the brightness level of the pixel value. Counters 126 include K up/down counters. Before the first set of pixel values, controller 142 asserts signal C1 to reset counters 126 and asserts signal C2 to put counters 126 in a count-up mode. Accordingly, for each pixel value in the first set, one of the K counters 126 increments a stored count. After comparator 124 compares every pixel value from the first set to the comparison values, controller 142 asserts signal C3 which causes counters 126 to output to the equalization value generating unit 128 counts representing a histogram.

For determination of a histogram for a non-boundary window, storage unit 120 outputs the second and third sets of pixel values to comparator 124. Controller 142 does not assert reset signal C1 before determination of a histogram for a non-boundary window. Accordingly, counters 126 contain the final counts for the previous window when histogram operation unit 122 begins to determine a histogram for a non-boundary window. For the second set of pixel values, controller asserts signal C2 so that one of the K counters 126 increments each time storage unit 120 outputs a pixel value from the second set to comparator 124. For the third set of pixel values, controller de-asserts signal C2 so that one of the K counters 126 decrements each time storage unit 120 outputs a pixel value from the third set to comparator 124. After storage unit 120 outputs all of the pixel values of the second and third sets to comparator 124, controller 142 asserts signal C3, and counters 126 output to equalized value generating unit 128 the final counts indicating a histogram for the non-boundary block.

Controller 142 determines the sequence of operations from information received via an input port IN2. This information includes parameters indicating the size of an image to be histogram-equalized, the offset in pixels to the next window, and the window size. Controller 142 generates address signal AD1 when the window to be histogram-equalized is a boundary window and second address signal AD2 when the window is the non-boundary window. Also, controller 142 outputs an up counting control signal (asserts signal C2) while the first or second set of pixel values is output from storage unit 120, and outputs a down counting control signal (de-asserts signal C2) while the third pixel data is output. Controller 142 asserts control signal C3 when comparator 124 has compared all the pixel values in the first set for a boundary block or all the pixel values in the second and third sets for a non-boundary block. Controller 142 generates a fourth control signal C4 to switch 138 according to the type of image data in storage unit 120 and generates a fifth control signal C5 for controlling the output from storage unit 140 when the equalization for an image is complete. Equalized value generating unit 128 and storage unit 140 of FIG. 5 operate in the same manner as equalized value generating unit 88 and storage unit 100 of FIG. 4. Storage unit 140 acts as a buffer.

As described above, in a contrast enhancement apparatus for an image processing system, the histogram equalization divides an image screen into overlapping windows and performs histogram equalization on the windows. Thus, a loss of contrast of pixel values which occur infrequently can be prevented or reduced. Additionally, overlapping the windows avoids introduction of image discontinuities at window boundaries. The window size and the offset from one window to the next are adjustable at the time of histogram equalization and can be optimized according to image quality. The histogram equalization can be selectively performed on an entire image or any part thereof to reduce image degradation in all or part of an image. As a further aspect of the invention, to reduce processing power required for equalization, a histogram operation for a current window starts from a histogram for a previous window. To further improve image quality and remove amplified thermal or quantization noise, low-pass filtered pixel data provides lookup table addresses that select histogram-equalized values.

For an exemplary embodiment of the invention, 9×9 windows with horizontal or vertical offsets of five pixels provide good image quality while minimizing the number of operations and removing discontinuity between adjacent windows.

The above image processing system can be used in a television, video cassette recorder, video camera, door phone, or security camera.

Although the invention has been described with reference to particular embodiments, the description is only an example of the invention's application and should not be taken as a limitation. In particular, even though much of preceding discussion was aimed at hardware or circuits embodiments of the invention, alternative embodiments of this invention include computer readable media containing software that implements histogram-equalization. Various other adaptations and combinations of features of the embodiments disclosed are within the scope of the invention as defined by the following claims.

We claim:

1. An image processing method comprising:
   (a) selecting a window that is first in a series of windows, wherein each window in the series covers an area in an image and overlaps an immediately preceding window in the series, the windows collectively covering a portion of the image that is larger than any individual one of the areas;
   (b) determining a histogram of pixel values for pixels in the selected window;
   (c) determining a transform function for the selected window from the histogram for the selected window;
   (d) applying the transform function for the selected window to pixel values corresponding to at least one of the pixels of the selected window, wherein applying the transform function to a pixel value generates an equalized value;
   (e) determining whether the selected window is last in the series;
   (f) selecting a window that is next in the series and repeating steps (b) through (f), if the selected window is not the last; and
   (g) displaying the image, if the selected window is the last, wherein visual appearance of pixels in the image as displayed varies according to the equalized values obtained in step (d), wherein applying the transform function comprises:
      low-pass-filtering brightness values for pixels in the selected window to generate filtered brightness values; and
      applying the transform function to the filtered brightness values.

2. An image processing method comprising:
   (a) selecting a window that is first in a series of windows, wherein each window in the series covers an area in an image and overlaps an immediately preceding window in the series, the windows collectively covering a portion of the image that is larger than any individual one of the areas;
   (b) determining a histogram of pixel values for pixels in the selected window;
   (c) determining a transform function for the selected window from the histogram for the selected window;
   (d) applying the transform function for the selected window to pixel values corresponding to at least one of the pixels of the selected window, wherein applying the transform function to a pixel value generates an equalized value;
   (e) determining whether the selected window is last in the series;
   (f) selecting a window that is next in the series and repeating steps (b) through (f), if the selected window is not the last, and
   (g) displaying the image, if the selected window is the last wherein visual appearance of pixels in the image as displayed varies according to the equalized values obtained in step (d), wherein applying the transform function comprises:
      band-pass-filtering brightness values for pixels in the selected window to generate filtered brightness values; and
      applying the transform function to the filtered brightness values.

3. An image processing method comprising:
(a) selecting a window that is first in a series of windows, wherein each window in the series covers an area in an image and overlaps an immediately preceding window in the series, the windows collectively covering a portion of the image that is larger than any individual one of the areas;
(b) determining a histogram of pixel values for pixels in the selected window;
(c) determining a transform function for the selected window from the histogram for the selected window;
(d) applying the transform function for the selected window to pixel values corresponding to at least one of the pixels of the selected window, wherein applying the transform function to a pixel value generates an equalized value;
(e) determining whether the selected window is last in the series;
(f) selecting a window that is next in the series and repeating steps (b) through (f), if the selected window is not the last; and
(g) displaying the image, if the selected window is the last wherein visual appearance of pixels in the image as displayed varies according to the equalized values obtained in step (d), wherein determining the histogram comprises:
  determining whether the selected window is a boundary window, a boundary window being a window that includes pixels on a selected edge of the portion of the image; and
  if the selected window is a boundary window, resetting counts that are associated with permitted levels for pixel values, and then for each pixel in the selected window, identifying a level for the pixel value associated with the pixel and incrementing a count associated with the level identified;
  if the selected window is not a boundary window, the method further comprises:
    retaining the counts at count values determined for a preceding window;
    for each pixel that is in the selected window and not in the preceding window, identifying a level for the pixel value associated with the pixel and incrementing a count associated with the level identified; and
    for each pixel that is in the preceding window and not in the selected window, identifying a level for the pixel value associated with the pixel and decrementing a count associated with the level identified.

4. An image processing method comprising:
(a) selecting a window that is first in a series of windows, wherein each window in the series contains pixels representing an image and the windows collectively cover a portion of the image;
(b) determining whether the selected window is a boundary window, a boundary window being a window that includes pixels on a selected edge of the portion of the image;
(c) if the selected window is a boundary window, determining a histogram of pixel values for the pixels in the selected window;
(d) if the selected window is not a boundary window, then:
  (d1) determining a first histogram of pixel values for pixels which are in the selected window and not in a previous window in the series;
  (d2) determining a second histogram of pixel values for pixels which are in the previous window and not in the selected window; and
  (d3) adding the first histogram to and subtracting the second histogram from a histogram determined for the previous window, a result being the histogram for the selected window;
(e) determining a transform function for the selected window from the histogram for the selected window;
(f) applying the transform function for the selected window to pixel values corresponding to at least one of the pixels of the selected window, wherein applying the transform function to a pixel value generates an equalized value;
(g) determining whether the selected window is last in the series;
(h) selecting a window that is next in the series and repeating steps (b) through (h), if the selected window is not the last; and
(i) displaying the image, if the selected window is the last, wherein visual appearance of pixels in the image as displayed varies according to the equalized values obtained in step (d), each window in the series overlaps an immediately preceding window in the series, and each window in the series has an offset from the preceding window.

5. The method according to claim 4, wherein each offset is in a horizontal direction.

6. The method according to claim 4, wherein each offset is in a vertical direction.

7. The method according to claim 4, wherein the portion of the image covered by the series of windows is the whole of the image.

8. The method according to claim 4, wherein the series of windows fails to cover the whole of the image.

9. The method of claim 4, wherein determining the histogram in step (c) comprises:
  identifying brightness levels for all of the pixels in the selected window; and
  counting occurrences of each brightness level in the selected window.

10. The method according to claim 4, wherein applying the transform function comprises:
  low-pass-filtering brightness values for pixels in the selected window to generate filtered brightness values; and
  applying the transform function to the filtered brightness values.

11. The method according to claim 4, wherein applying the transform function comprises:
  band-pass-filtering brightness values for pixels in the selected window to generate filtered brightness values; and
  applying the transform function to the filtered brightness values.

12. An apparatus for contrast enhancement in an image processing system, the apparatus comprising:
  a first data storage unit for storing pixel values, wherein in response to a first address signal, the first data storage unit outputs a first set of pixel values representing pixels in a window, and in response to a second address signal, the first data storage unit outputs a second set of pixel values representing a first number of pixels in the window;
  a histogram operation unit coupled to receive the first set of pixel values, the histogram operation unit generating a set of counts indicating a histogram of the first set of pixel values;

an equalized value generating unit coupled to receive the set of counts from the histogram operation unit and the second set of pixel values from the storage unit, the equalized value generating unit determining a transform function from the counts, and applying the transform function to the second set of pixel values to generate equalized values, wherein the equalized value generating unit further comprises a low-pass filter for low-pass filtering the second set of pixel values received from the image data storage unit and outputting filtered data as addresses for a look up table;

a second storage unit for storing the equalized values from the equalized value generating unit; and a controller that generates the first address signal and the second address signal, wherein the controller sequentially changes the first address signal to addresses corresponding to a selected current window in a series of windows that collectively cover a portion of an image, wherein the current window overlaps an immediately preceding window in the series.

13. The apparatus of claim 12, wherein the equalized value generating unit comprises:

an accumulator for receiving and accumulating counts in the set of counts;

a transform function unit for performing an arithmetic operation on accumulated counts to determine results indicating the equalized values; and a look-up table coupled to store the results from the transform function unit at addresses corresponding to the second set of pixel values.

14. The apparatus of claim 13, wherein the first number of pixels in the window is determined in response to an offset from the preceding window in the series.

15. The apparatus of claim 12, further comprising a switch that selects one of the second set of pixel values from the first data storage unit and the filtered data output from the low-pass filter and outputs the selected one as the addresses for the look up table, wherein the controller controls a selection operation of the switch according to the image type for pixel values stored in the first data storage unit.

16. An apparatus for contrast enhancement in an image processing system, the apparatus comprising:

a first data storage unit for storing pixel values, wherein in response to a first address signal, the first data storage unit outputs a first set of pixel values representing pixels in a window, and in response to a second address signal, the first data storage unit outputs a second set of pixel values representing a first number of pixels in the window;

a histogram operation unit coupled to receive the first set of pixel values, the histogram operation unit generating a set of counts indicating a histogram of the first set of pixel values;

an equalized value generating unit coupled to receive the set of counts from the histogram operation unit and the second set of pixel values from the storage unit, the equalized value generating unit determining a transform function from the counts, and applying the transform function to the second set of pixel values to generate equalized values, wherein the equalized value generating unit further comprises a band-pass filter for band-pass-filtering the second set of pixel values received from the image data storage unit and outputting filtered data as addresses for a look up table;

a second storage unit for storing the equalized values from the equalized value generating unit; and a controller that generates the first address signal and the second address signal, wherein the controller sequentially changes the first address signal to addresses corresponding to a selected current window in a series of windows that collectively cover a portion of an image, wherein the current window overlaps an immediately preceding window in the series.

17. The apparatus of claim 16, further comprising a switch that selects one of the second set of pixel values from the first data storage unit and the filtered data output from the band-pass filter and outputs the selected one as the addresses for the look up table, wherein the controller controls a selection operation of the switch according to an image type for pixel values stored in the first data storage unit.

18. A histogram equalization apparatus for histogram-equalizing image data of an image screen, in a contrast enhancement apparatus for an image processing systems, the apparatus comprising:

an image data storage unit for storing the image data, outputting first pixel data in response to a first address signal, outputting second pixel data in response to a second address signal, and outputting third pixel data in response to a third address signal, wherein the first pixel data represents all pixels included in a boundary window, the second pixel data represents pixels that are in a non-boundary window and not in a previous window and pixels that are in the previous window and not in the non-boundary window, and the third pixel data represents a first number of pixels among pixels in a current window;

a histogram operation unit for generating a histogram, wherein in response to a first control signal, the histogram is generated from the first pixel data, and in response to a second control signal, the histogram is generated by generating second and third histograms from the second pixel data, summing the second histogram and a histogram generated for the previous window and subtracting the third histogram from a resulting sum, and outputting a result as the histogram;

an equalized value generating unit for accumulating counts in the histogram from the histogram operation unit, and outputting in response to the third pixel data, the first number of equalized values that are calculated using accumulated counts;

an equalized value storage unit for storing the equalized values and outputting all of the stored histogram-equalized values as histogram-equalized values of the image data; and a controller for generating the first address signal and the first control signal when the current window, which is to be histogram-equalized, is a boundary window, generating the second address signal and the second control signal when the current window is a non-boundary window, and generating the third address signal, wherein the current window overlaps the preceding window in a series of windows.

19. The apparatus of claim 18, wherein the histogram operation unit comprises:

a comparator for comparing the first or second pixel data with a second number of comparison values, each comparison value representing a brightness level, and outputting the second number of comparison results; and a counter for up counting the second number of comparison results in response to the first control signal, up or down counting the second predetermined number of comparison results, using the histogram of the previous window as an initial value in response to the second control signal, and outputting the counts as the histogram to the equalized value generating unit in response to a third control signal, wherein the controller outputs the third control signal when all pixels of the first pixel data or the second pixel data have been compared by the comparator.

20. The apparatus of claim 18, wherein the controller changes the third address signal according to an offset between windows.

21. The apparatus of claim 18, wherein the equalized value generating unit comprises:

an accumulator for receiving the histograms and accumulating the counts contained in the histograms;

a transform function unit for performing a transform function obtained using the accumulated counts, through multiplication and division, and outputting the results as the equalized values; and a look-up table for storing the equalized values in addresses and outputting the stored values to the equalized value storage unit in response to the third pixel data.

22. The apparatus of claim 21, wherein the equalized value generating unit further comprises a low-pass filter for low-pass-filtering the third pixel data received from the image data storage unit and outputting the filtered data as the addresses of the look up table.

23. The apparatus of claim 21, wherein the equalized value generating unit further comprises a band-pass filter for band-pass-filtering the third pixel data received from the image data storage unit and outputting the filtered data as the addresses of the look up table.

* * * * *